US012264695B2

(12) United States Patent
Sano (10) Patent No.: US 12,264,695 B2
(45) Date of Patent: Apr. 1, 2025

(54) FIXING DEVICE

(71) Applicant: Mitutoyo Corporation, Kanagawa (JP)

(72) Inventor: Hidekazu Sano, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 465 days.

(21) Appl. No.: 17/525,633

(22) Filed: Nov. 12, 2021

(65) Prior Publication Data

US 2022/0154916 A1 May 19, 2022

(30) Foreign Application Priority Data

Nov. 16, 2020 (JP) ................. 2020-190365

(51) Int. Cl.
| F16B 2/06 | (2006.01) |
| F16B 7/14 | (2006.01) |
| G02B 7/02 | (2021.01) |

(52) U.S. Cl.
CPC .............. *F16B 2/06* (2013.01); *F16B 7/1418* (2013.01); *G02B 7/02* (2013.01); *G02B 7/021* (2013.01)

(58) Field of Classification Search
CPC ..................................................... F16B 7/1418
See application file for complete search history.

(56) References Cited

U.S. PATENT DOCUMENTS

| 4,185,808 A * | 1/1980 | Donohoe | G10D 13/28 84/421 |
| 4,660,870 A * | 4/1987 | Donley | F16L 55/1715 285/373 |
| 4,744,690 A * | 5/1988 | Hsieh | F16B 7/1418 403/104 |
| 5,259,690 A * | 11/1993 | Legge | E04G 7/14 24/270 |
| 6,155,743 A * | 12/2000 | Chen | F16B 7/1418 403/374.1 |
| 6,312,184 B1* | 11/2001 | Hoshino | F16B 7/1418 403/373 |
| 6,370,740 B1* | 4/2002 | Foreman | B66C 1/42 24/339 |
| 9,038,501 B2* | 5/2015 | Li | B62K 21/125 74/551.9 |
| 9,631,656 B2* | 4/2017 | Sato | F16B 7/1418 |
| 10,051,930 B2* | 8/2018 | Heim | A45B 9/00 |
| 11,543,058 B2* | 1/2023 | Liao | F16L 21/065 |
| 11,835,073 B2* | 12/2023 | Stilson | F16B 2/08 |
| 11,925,828 B2* | 3/2024 | Inniss | A63B 21/0726 |

(Continued)

FOREIGN PATENT DOCUMENTS

JP 2016-100293 5/2016

*Primary Examiner* — Matthew R McMahon
(74) *Attorney, Agent, or Firm* — Rankin, Hill & Clark LLP (57) ABSTRACT

To provide a fixing device improved in fixation of an annular member to a cylindrical member. The fixing device for fixing the annular member to the cylindrical member that includes a first fixing portion and a second fixing portion. The first fixing portion includes an annular portion and an adjustment portion. The annular portion covers an outer peripheral surface of the cylindrical member from outward in a radial direction. A circumferential length of the annular portion is adjustable with the adjustment portion. The second fixing portion is fixed to the first fixing portion and fixed to the annular member.

16 Claims, 5 Drawing Sheets

(56) References Cited

U.S. PATENT DOCUMENTS

| | | | |
|---|---|---|---|
| 2003/0090904 A1* | 5/2003 | Ching | F16M 11/242 |
| | | | 362/418 |
| 2011/0103885 A1* | 5/2011 | Li | B62K 21/26 |
| | | | 403/316 |
| 2012/0219354 A1* | 8/2012 | Bauer | F16B 2/12 |
| | | | 403/187 |
| 2016/0147055 A1* | 5/2016 | Moriuchi | G02B 21/084 |
| | | | 359/387 |
| 2017/0014827 A1* | 1/2017 | Gilligan | B01F 35/42 |

* cited by examiner

FIXING DEVICE

TECHNICAL FIELD

The present invention relates to a fixing device, and particularly relates to a fixing device that fixes an annular member to a cylindrical member.

BACKGROUND ART

Conventionally, a lens device, such as an objective lens, formed by housing a plurality of lenses in a lens barrel has been known. The lens device is used for, for example, an image measurement device that captures an image of an object to be measured and measures the object to be measured based on the obtained image, or an optical instrument, such as a microscope, that magnifies and observes the object to be measured. Such an optical instrument uses a ring light to illuminate the object to be measured (see, for example, Patent Document 1). The lens device is an example of a cylindrical member, and the ring light is an example of an annular member.

Patent Document 1 discloses that, an LED substrate is divided at a plurality of locations in a circumferential direction on an LED ring light disposed on an outer peripheral side of an objective lens to improve a yield thereof. The LED is an abbreviation for a Light Emitting Diode.

CITATION LIST

Patent Literature

Patent Document 1: JP 2016-100293 A

SUMMARY OF INVENTION

Technical Problem

To illuminate the object to be measured with the ring light, a positional relationship between the lens device and the ring light needs to be determined, and fixing the ring light to the lens device is desirable. On the other hand, in the invention described in Patent Document 1, the LED ring light is fixed to an image measuring device with the objective lens fixed to the image measuring device, and the invention does not disclose that the ring light is directly fixed to the lens device.

To fix the ring light to the lens device, it is considered that a clamp screw is inserted inward in a radial direction from an outer peripheral side of the ring light with the ring light inserted into an outer periphery of the lens device, and the clamp screw is butted against the outer peripheral surface of the lens device for fixation.

However, the fixation with the clamp screw had a problem in that a fixing force of the clamp screw is weak to a weight of the ring light, possibly resulting in falling of the clamp screw. In addition, this had a problem of poor workability during the fixation with the clamp screw. Furthermore, in this case, since the clamp screw is butted against the outer peripheral surface of the lens device, there had a problem of damaging the outer peripheral surface of the lens device.

The invention has been made in order to solve the problems described above, and an object of the invention is to provide a fixing device improved in fixation of an annular member to a cylindrical member.

Solution to Problem

In order to solve the above-described problem, an aspect of the invention is a fixing device for fixing an annular member to a cylindrical member. The fixing device includes a first fixing portion and a second fixing portion. The first fixing portion includes an annular portion and an adjustment portion. The annular portion covers an outer peripheral surface of the cylindrical member from outward in a radial direction. A circumferential length of the annular portion is adjustable with the adjustment portion. The second fixing portion is fixed to the first fixing portion and fixed to the annular member.

According to the invention, by adjusting the circumferential length of the annular portion, which covers the outer peripheral surface of the cylindrical member, with the first fixing portion, the first fixing portion can be fixed to the outer peripheral surface of the cylindrical member, and the annular member can be fixed to the cylindrical member with a strong fixing force.

That is, according to the invention, the fixing device improved in fixation of the annular member to the cylindrical member can be provided.

In a preferred aspect of the invention, the annular portion has an inner peripheral surface opposed to the outer peripheral surface of the cylindrical member. The adjustment portion shortens the circumferential length of the annular portion to move at least a portion of the inner peripheral surface inward in the radial direction.

According to the invention, by moving the inner peripheral surface of the first fixing portion inward in the radial direction, the annular member can be fixed to the cylindrical member with a strong fixing force by the inner peripheral surface of the first fixing portion.

In a preferable aspect of the invention, the annular portion includes a C-shaped portion having a C-shape and a connecting portion. The C-shaped portion is formed by cutting a portion in a circumferential direction of a circular ring. The connecting portion connects an end portion on one side in the circumferential direction of the C-shaped portion and an end portion on the other end portion in the circumferential direction of the C-shaped portion. The adjustment portion adjusts a distance between the end portion on the one side in the circumferential direction of the C-shaped portion and the end portion on the other side in the circumferential direction of the C-shaped portion by screwing the connecting portion.

According to the invention, the adjustment portion adjusts the distance between the end portion on the one side in the circumferential direction of the C-shaped portion and the end portion on the other side in the circumferential direction of the C-shaped portion by screwing the connecting portion, and therefore the circumferential length of the annular portion can be easily adjusted.

In a preferred aspect of the invention, the connecting portion extends in a direction orthogonal to an axial direction. The second fixing portion is located outward in the radial direction of the first fixing portion. The second fixing portion includes a through-hole. The through-hole penetrates from inward in the radial direction to outward in the radial direction along a direction in which the connecting portion extends.

According to the invention, the connecting portion is easily accessed, and workability when the annular member is fixed to the cylindrical member and the annular member is removed from the cylindrical member can be improved.

In a preferred aspect of the invention, a buffer portion located between the cylindrical member and the first fixing portion is provided.

According to the invention, the buffer portion allows protecting the outer peripheral surface of the cylindrical member so as not to be scratched.

In a preferred aspect of the invention, the buffer portion serves as a spacer between the cylindrical member and the first fixing portion.

According to the invention, by the buffer portion serving as the spacer, a gap between an outer diameter of the cylindrical member and an inner diameter of the first fixing portion can be filled without providing another member, and thus application to cylindrical members having further various outer diameters is possible.

In a preferred aspect of the invention, the cylindrical member is a lens device. The annular member is a ring light.

According to the invention, the ring light can be fixed to the lens device with a strong fixing force.

Advantageous Effects of Invention

According to the invention, the fixing device improved in fixation of the annular member to the cylindrical member can be provided.

Problems, configurations, and effects other than those described above will be apparent from the following description of embodiments.

DESCRIPTION OF EMBODIMENTS

Hereinafter, a fixing device according to the invention will be described in detail with reference to the drawings. Note that, in the following drawings, for example, a scale and a count differ between the actual structure and each structure in some cases for ease of understanding of each configuration.

In the drawings, an XYZ coordinate system is indicated as a three-dimensional orthogonal coordinate system as appropriate. In the X, Y, and Z axes, a side pointed by an arrow is referred to as a +(plus) side or one side, and the opposite side is referred to as a –(minus) side or the other side. The Z-axis direction is a direction parallel to a center axis J of a lens 101 illustrated in FIG. 1. The Z-axis direction is simply referred to as an "axial direction". Additionally, the + side in the axial direction is referred to as "one side in the axial direction", and the – side in the axial direction is referred to as "the other side in the axial direction". In addition, a radial direction of a circle around the center axis J is simply referred to as a "radial direction", and a circumferential direction about the axis around the center axis J is simply referred to as a "circumferential direction". Additionally, in the radial direction, a side near the center axis J is referred to as "inward in a radial direction", and a side far from the center axis J is referred to as "outward in a radial direction". In addition, in the circumferential direction, a side advancing clockwise as viewed from the other side in the axial direction toward one side in the axial direction is referred to as "one side in the circumferential direction" and a side advancing counterclockwise is referred to as "the other side in the circumferential direction".

Note that the axial direction, the radial direction, the circumferential direction, one side, and the other side are simply names for describing relative positional relationships of respective portions, and the actual arrangement relationship or the like may be an arrangement relationship or the like other than the arrangement relationship or the like described by these names. Furthermore, in the present specification, orientations, such as a front, a rear, a left, a right, a top, and a bottom indicate orientations seen in the drawings, and do not intend to limit orientations when a device according to the invention is used.

Note that in the present specification, "extending in the X-axis direction, the Y-axis direction, or the Z-axis direction" includes a case of extending in a direction inclined within a range of less than 45° with respect to the X-axis direction, the Y-axis direction, or the Z-axis direction, in addition to the case of extending strictly in the X-axis direction, the Y-axis direction, or the Z-axis direction.

Example 1

Structure of Fixing Device 100

Figure 1:
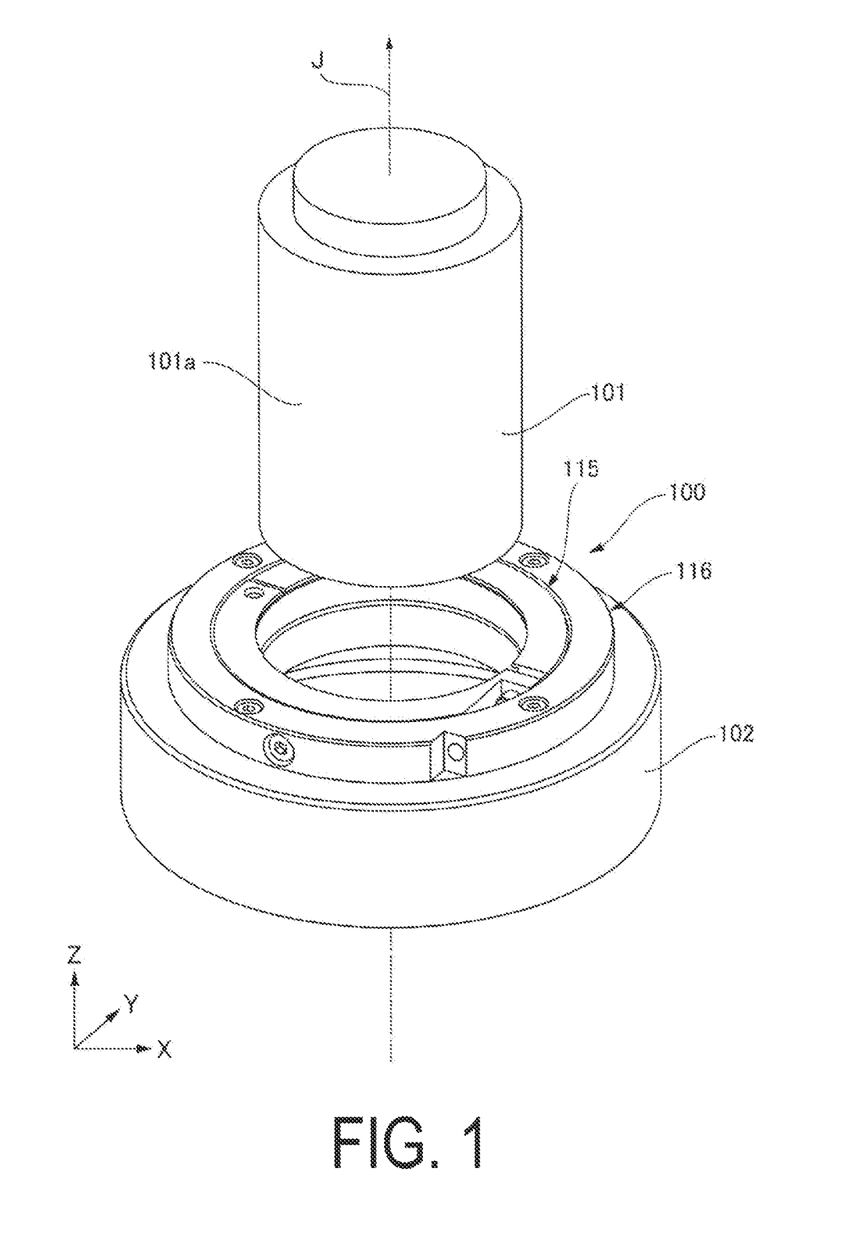
FIG. 1 is a perspective view illustrating a fixing device according to Example 1 of the invention.
Figure 2:
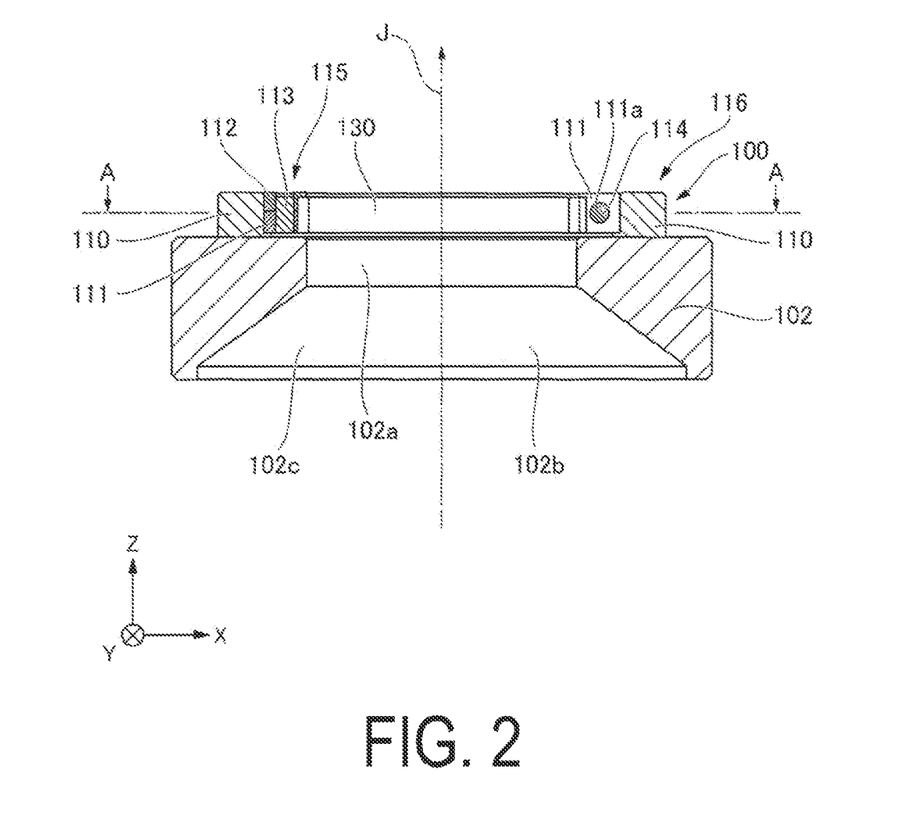
FIG. 2 is a side cross-sectional view in a state where a fixing device 100 fixed to a ring light 102.
Figure 3:
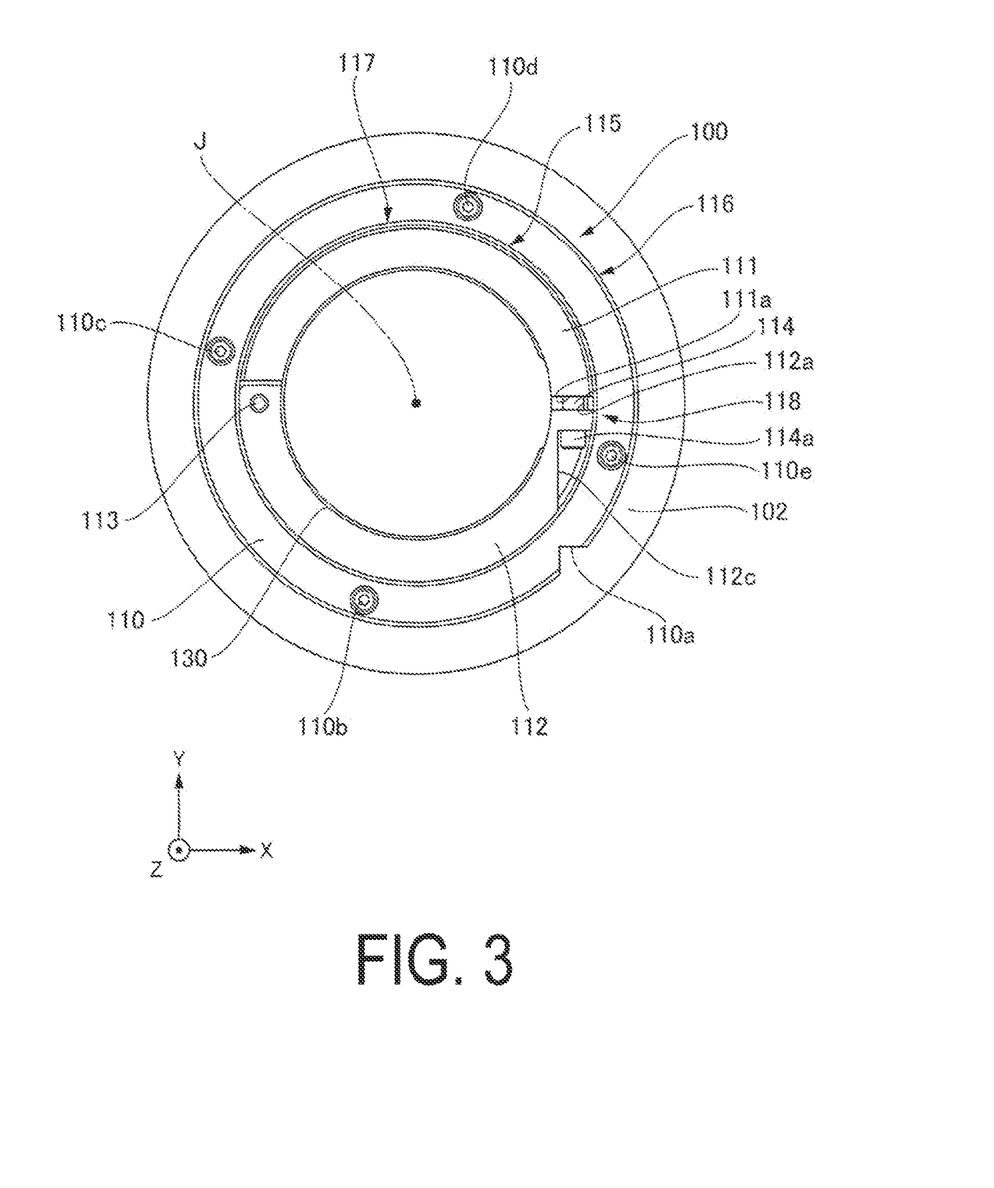
FIG. 3 is a plan view of the fixing device 100 and the ring light 102 viewed from one side in an axial direction.

FIG. 1 is a perspective view illustrating a fixing device according to Example 1 of the invention. FIG. 2 is a side cross-sectional view of the fixing device 100 illustrated in FIG. 1 fixed to a ring light 102. FIG. 2 is a view illustrating the fixing device 100 and the ring light 102 taken along a surface passing through the center axis J and orthogonal to the Y-axis. FIG. 3 is a plan view of the fixing device 100 and the ring light 102 as viewed from one side in the axial direction.

The lens 101 is an example of a cylindrical member. The lens 101 is, for example, an objective lens formed by hosing a plurality of lenses in a cylindrical lens barrel. The lens 101 may be a lens other than an objective lens. The lens 101 has an optical axis in a direction parallel to the center axis J. An object to be measured, which is a target for measurement with the lens 101, is disposed on the other side in the axial direction of the ring light 102. The lens 101 has an outer peripheral surface 101a.

The ring light 102 is an example of an annular member. The ring light 102 has a through-hole 102a that penetrates in the axial direction. The through-hole 102a has an inner diameter greater than an outer diameter of the lens 101. The lens 101 is insertable into the through-hole 102a in the ring light 102. A surface 102c, which is a surface on the other side in the axial direction of the ring light 102, is an inverted tapered surface so that an inward in the radial direction is located on one side in the axial direction with respect to an outward in the radial direction. The surface 102c of the ring light 102 includes a light 102b over its entire surface. The light 102b is, for example, a plurality of LED lights. The light 102b illuminates the object to be measured, which is disposed on the other side in the axial direction of the ring light 102.

The fixing device 100 includes a first fixing portion 115 fixed to the lens 101, and a second fixing portion 116 fixed to the first fixing portion 115 and the ring light 102. The ring light 102 is fixed to the lens 101 via the fixing device 100. The first fixing portion 115 includes an annular portion 117 that covers the outer peripheral surface 101a of the lens 101 from outward in the radial direction, and an adjustment portion 118 configured to adjust a circumferential length of the annular portion 117.

The fixing device 100 includes a buffer portion 130 located between the lens 101 and the first fixing portion 115. The buffer portion 130 is an annular resin member. By providing the buffer portion 130 between the lens 101 and the first fixing portion 115, damage of the outer peripheral surface 101a of the lens 101 can be prevented.

Note that the buffer portion 130 can also serve as a spacer between the lens 101 and the first fixing portion 115. With the use of the buffer portion 130 as the spacer, a plurality of types of the buffer portions 130 having different radial thicknesses are prepared. According to a difference between the outer diameter of the lens 101 and the inner diameter of the first fixing portion 115, the buffer portion 130 having the thickness with which the outer peripheral surface 101a of the lens 101 can be firmly fixed can be selected for use. By the buffer portion 130 serving as the spacer, the fixing device 100 can fill a gap between the outer diameter of the lens 101 and the inner diameter of the first fixing portion 115 without providing another member. This allows the fixing device 100 to be applied to the lenses 101 having various outer diameters.

The second fixing portion 116 includes a frame portion 110 as an annular member. The second fixing portion 116 is located outward in the radial direction of the first fixing portion 115. The second fixing portion 116 includes axially extending screws 110b, 110c, 110d, and 110e. The frame portion 110 is fixed to the surface on one side in the axial direction of the ring light 102 with the screws 110b, 110c, 110d, and 110e.

The annular portion 117 of the first fixing portion 115 includes a first fixing piece 111 and a second fixing piece 112 having a substantially semi-circular shape. The annular portion 117 is disposed outward in the radial direction of the outer peripheral surface 101a of the lens 101. The first fixing piece 111 has a step recessed toward the other side in the axial direction on the end portion on one side in the circumferential direction. The second fixing piece 112 has a step recessed toward one side in the axial direction on the end portion on the other side in the circumferential direction. The step on the end portion on one side in the circumferential direction of the first fixing piece 111 and the step on the end portion on the other side in the circumferential direction of the second fixing piece 112 fit to one another in the circumferential direction and the axial direction. A pin 113 extends axially. The pin 113 penetrates the step at the end portion on one side in the circumferential direction of the first fixing piece 111 and the step at the end portion on the other side in the circumferential side of the second fixing piece 112 to join the first fixing piece 111 and the second fixing piece 112. The first fixing piece 111 and the second fixing piece 112 are rotatable with the pin 113 as the rotational center in a surface orthogonal to the Z-axis. The first fixing piece 111 and the second fixing piece 112 are an example of a C-shaped portion having a C-shape formed by cutting a portion in the circumferential direction of the circular ring.

The end portion on the other side in the circumferential direction of the first fixing piece 111 is opposed to the end portion on one side in the circumferential direction of the second fixing piece 112 in the circumferential direction. The adjustment portion 118 is provided at a position where the end portion on the other side in the circumferential direction of the first fixing piece 111 is opposed to the end portion on one side in the circumferential direction of the second fixing piece 112. The first fixing piece 111 has a screw hole 111a in the end portion on the other side in the circumferential direction. The screw hole 111a extends in a direction away from the end portion on one side in the circumferential direction of the second fixing piece 112. The screw hole 111a extends in a direction orthogonal to the axial direction. The second fixing piece 112 has a through-hole 112a in an end portion on one side in the circumferential direction. The through-hole 112a penetrates in the direction in which the screw hole 111a extends. The adjustment portion 118 includes the screw hole 111a and the through-hole 112a.

The annular portion 117 has a screw 114. The screw 114 connects the end portion on the other side in the circumferential direction of the first fixing piece 111 and the end portion on one side in the circumferential direction of the second fixing piece 112. In other words, the screw 114 is an example of a connecting portion that connects the end portion on one side in the circumferential direction of the C-shaped portion and the end portion on the other side in the circumferential direction of the C-shaped portion. The screw 114 extends in a direction orthogonal to the axial direction. The screw 114 is inserted into the through-hole 112a from a direction opposite to the first fixing piece 111. The screw 114 has a screw head 114a. The screw head 114a has a diameter larger than a diameter of the through-hole 112a. The screw 114 inserted into the through-hole 112a is inserted into the screw hole 111a by the end portion on one side in the circumferential direction. The adjustment portion 118 adjusts a depth of screwing the screw 114 into the screw hole 111a to adjust a distance between the end portion on the other side in the circumferential direction of the first fixing piece 111 and the end portion on one side in the circumferential direction of the second fixing piece 112.

The second fixing piece 112 has a notch portion 112c that opens the direction in which the screw 114 extends such that a driver or the like is not obstructed during rotation of the screw 114 with the driver or the like. Also, the frame portion 110 has a through-hole 110a extending in the direction in which the screw 114 extends such that a driver or the like is not obstructed during rotation of the screw 114 with the driver or the like. The through-hole 110a penetrates outward in the radial direction from inward in the radial direction along the direction in which the screw 114 extends.

Figure 4:
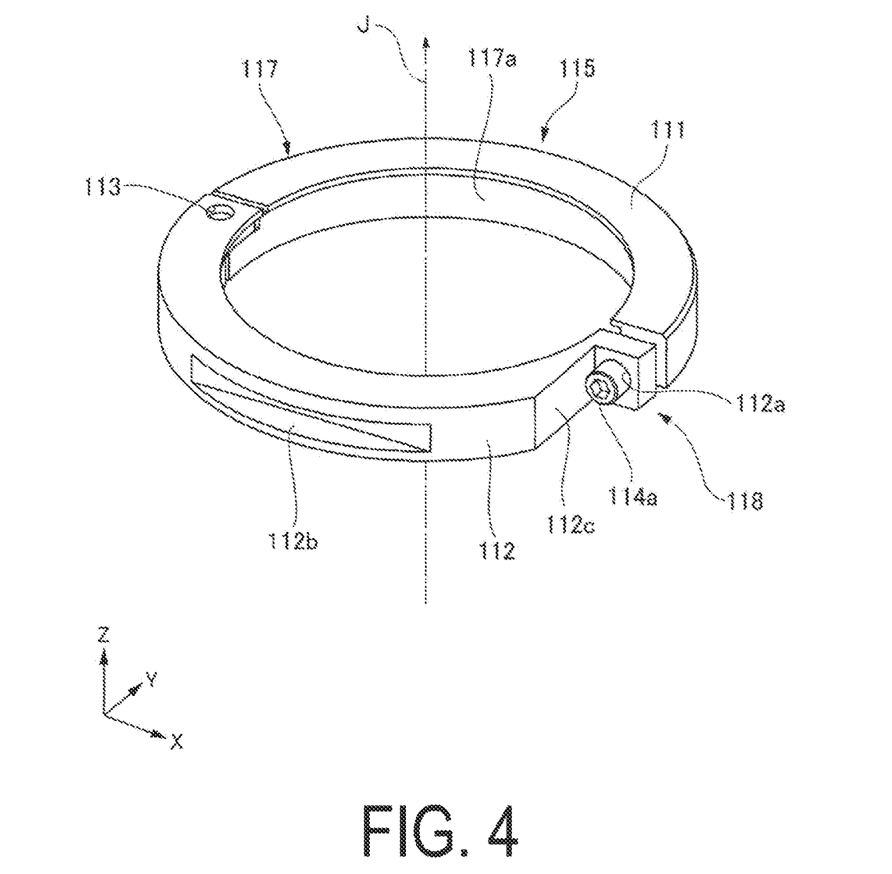
FIG. 4 is a perspective view of a first fixing portion 115.
Figure 5:
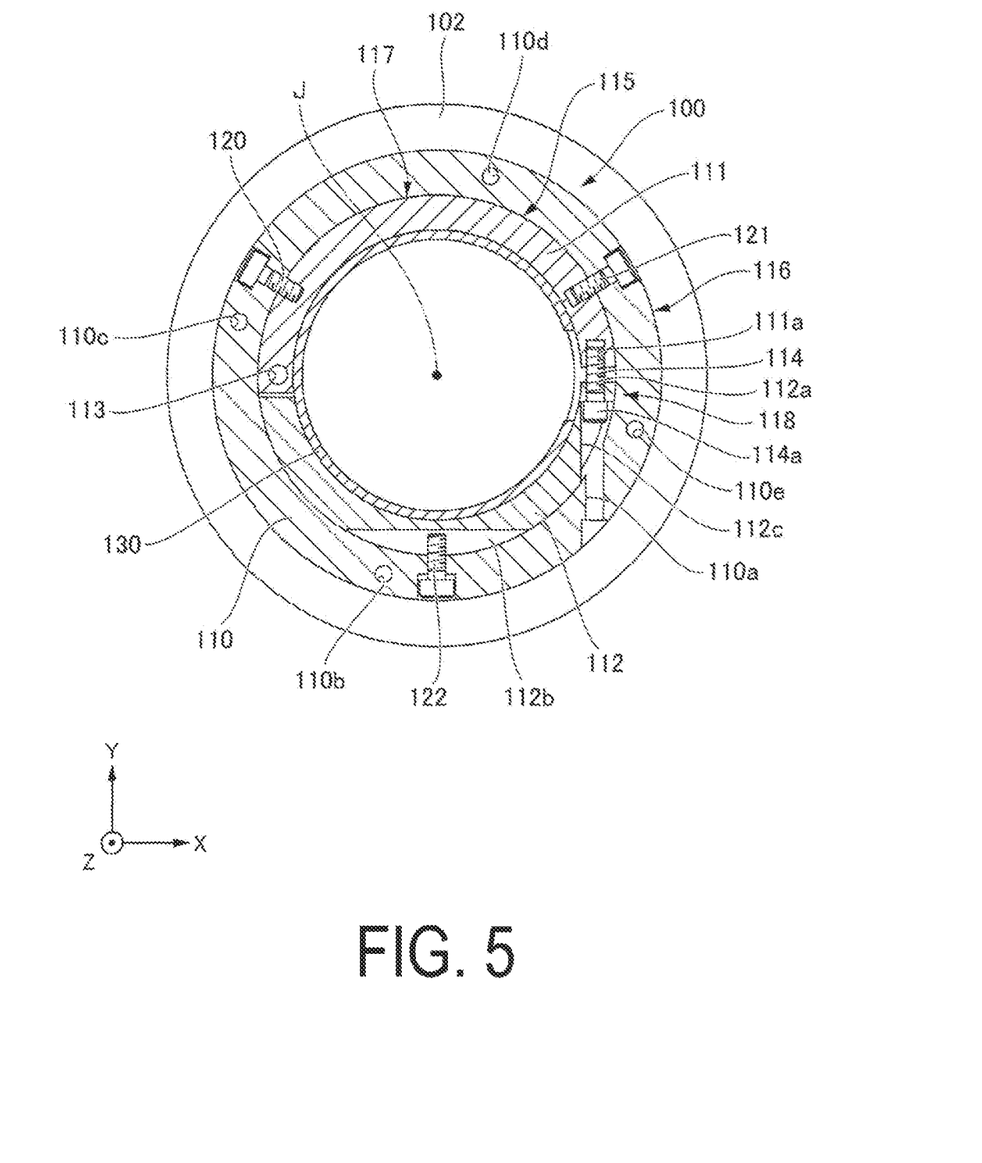
FIG. 5 is a planar cross-sectional view of the fixing device 100 and the ring light 102 taken along the cut line A-A indicated in FIG. 2 and viewed from one side in the axial direction.

FIG. 4 is a perspective view of the first fixing portion 115. FIG. 5 is a planar cross-sectional view of the fixing device 100 and the ring light 102 taken along the cut line A-A indicated in FIG. 2 and viewed from one side in the axial direction. In FIG. 5, the fixing device 100 is taken along a surface passing through the cut line A-A and orthogonal to the Z-axis.

The annular portion 117 has an inner peripheral surface 117a opposed to the outer peripheral surface 101a of the lens 101. The buffer portion 130 is located between the outer peripheral surface 101a of the lens 101 and the inner peripheral surface 117a of the annular portion 117. The adjustment portion 118 shortens the circumferential length of the annular portion 117 to move at least a portion of the inner peripheral surface 117a inward in the radial direction, and the fixing device 100 is fixed to the lens 101.

The second fixing portion 116 includes radially extending screws 120, 121, and 122. The frame portion 110 is fixed to the first fixing piece 111 with the screws 120 and 121. In the example, the second fixing piece 112 is not directly fixed to the frame portion 110. The second fixing piece 112 is rotatable about the pin 113 and is fixed to the first fixing piece 111 with the screw 114. The second fixing piece 112 has a through-hole 112b that penetrates in the radial direction. The screw 122 penetrates the frame portion 110 from outward in the radial direction and reaches the through-hole 112b of the second fixing piece 112. As a result, the axial movement of the second fixing piece 112 is restricted, and falling of the second fixing piece 112 from the frame portion 110 can be prevented. Note that the fixing device 100 may fix the second fixing piece 112 to the frame portion 110 with the screw 122.

(Operation of Fixing Device 100)

To fix the ring light 102 to the lens 101, after the fixing device 100 is fixed to the ring light 102, the fixing device 100 is fixed to the lens 101. To fix the fixing device 100 to the ring light 102, the frame portion 110 is fixed to a surface on one side in the axial direction of the ring light 102 with the screws 110b, 110c, 110d, and 110e. Thereafter, to fix the fixing device 100 to the lens 101, first, the screw 114 of the fixing device 100 is loosened to expand the inner diameter of the annular portion 117 (a state in which the circumferential length is lengthened). Thereafter, the lens 101 is inserted inside the buffer portion 130. In this state, the screw 114 is screwed to reduce the inner diameter of the annular portion 117 (a state in which the circumferential length is shortened), thus fixing the fixing device 100 to the lens 101.

According to the example, the fixing device having high versatility in which the circumferential length of the annular portion 117 can be adjusted by the depth of screwing the screw 114 and can accommodate lenses with outer diameters having various sizes can be provided.

Note that the order of fixation is not limited to the order described above. After the fixing device 100 is fixed to the lens 101, the ring light 102 may be fixed to the fixing device 100.

The invention is not limited to the above-described example and includes various modifications. For example, the above-described example is described in detail for easy understanding of the description of the invention, and is not necessarily limited to ones that include all the described configurations. A part of the configuration of one example can be replaced by the configuration of another example, or the configuration of another example can be added to the configuration of one example. Additionally, another configuration can be added to, removed from, or replaced by a part of the configuration in each example.

REFERENCE SIGNS LIST

100 . . . Fixing device
101 . . . Lens
102 . . . Ring light

The invention claimed is:

1. A fixing device for fixing an annular member to a cylindrical member, the fixing device comprising:
a first fixing portion that includes an annular portion and an adjustment portion, the annular portion covering an outer peripheral surface of the cylindrical member from outward in a radial direction, a circumferential length of the annular portion being adjustable with the adjustment portion, wherein the annular portion of the first fixing portion includes a first fixing piece and a second fixing piece; and
a second fixing portion that is fixed to the annular member, wherein the first fixing piece is immovably fixed to the second fixing portion while the second fixing piece is movable relative to the second fixing portion so that the circumferential length of the annular portion can be changed by operation of the adjustment portion;
wherein the second fixing piece is secured to the second fixing portion to restrict axial movement of the second fixing piece relative to the second fixing portion and the annular member; and,
wherein a pivotal connection is provided between the first and second fixing pieces, said pivotal connection being radially opposite to said adjustment portion, and said second fixing piece being secured to the second fixing portion at a location that is between said pivotal connection and said adjustment portion.

2. The fixing device according to claim 1, wherein
the annular portion has an inner peripheral surface opposed to the outer peripheral surface of the cylindrical member; and
the adjustment portion shortens the circumferential length of the annular portion to move at least a portion of the inner peripheral surface inward in the radial direction.

3. The fixing device according to claim 2, wherein
each of the first and second fixing pieces have a C-shape and a connecting portion, the connecting portion connects an end portion of the first fixing piece in the circumferential direction of the annular portion and an end portion of the second fixing piece; and
the adjustment portion adjusts a distance between the end portions of the first and second fixing pieces by screwing the connecting portion.

4. The fixing device according to claim 3, wherein
the connecting portion extends in a direction orthogonal to an axial direction; and
the second fixing portion is located outward in the radial direction of the first fixing portion, the second fixing portion includes a through-hole, and the through-hole extends through the second fixing portion to provide access to the connecting portion which is provided on the first fixing portion and disposed inward in the radial direction of the second fixing portion.

5. The fixing device according to claim 1, comprising
a buffer portion disposed between the cylindrical member and the first fixing portion, and wherein the first fixing portion is interposed between the buffer portion and the second fixing portion.

6. The fixing device according to claim 5, wherein
the buffer portion serves as a spacer between the cylindrical member and the first fixing portion.

7. The fixing device according to claim 1, wherein
the cylindrical member is a lens; and
the annular member is a ring light.

8. A fixing device for fixing a ring light to a cylindrical lens, said ring light being annular and having a central opening defining an axis and a surface orthogonal to the axis, said cylindrical lens being disposed along said axis and extending away from the surface of the ring light, the fixing device comprising:
a first fixing portion that includes an annular portion surrounding said axis and an adjustment portion, the annular portion being disposed adjacent said ring light surface and covering an outer peripheral surface of the cylindrical lens from outward in a radial direction, a circumferential length of the annular portion being adjustable with the adjustment portion, wherein the annular portion of the first fixing portion includes a first fixing piece and a second fixing piece; and
a second fixing portion that is fixed to the ring light surface, said second fixing portion being separate from said first fixing portion and radially surrounding the first fixing portion, wherein the first fixing piece is immovably fixed to the second fixing portion while the second fixing piece is movable relative to the second fixing portion so that the circumferential length of the annular portion can be changed by operation of the adjustment portion.

9. The fixing device according to claim 8, wherein the second fixing piece is secured to the second fixing portion to restrict axial movement of the second fixing piece relative to the second fixing portion and the ring light.

10. The fixing device according to claim 9, wherein a pivotal connection is provided between the first and second fixing pieces, said pivotal connection being radially opposite to said adjustment portion, and said second fixing piece being secured to the second fixing portion at a location that is between said pivotal connection and said adjustment portion.

11. The fixing device according to claim 8, wherein
the annular portion has an inner peripheral surface opposed to the outer peripheral surface of the cylindrical lens; and
the adjustment portion shortens the circumferential length of the annular portion to move at least a portion of the inner peripheral surface inward in the radial direction.

12. The fixing device according to claim 11, wherein
each of the first and second fixing pieces have a C-shape and a connecting portion, the connecting portion connects an end portion of the first fixing piece in the circumferential direction of the annular portion and an end portion of the second fixing piece; and
the adjustment portion adjusts a distance between the end portions of the first and second fixing pieces by screwing the connecting portion.

13. The fixing device according to claim 12, wherein
the connecting portion extends in a direction orthogonal to an axial direction; and
the second fixing portion is located outward in the radial direction of the first fixing portion, the second fixing portion includes a through-hole, and the through-hole extends through the second fixing portion to provide access to the connecting portion which is provided on the first fixing portion and disposed inward in the radial direction of the second fixing portion.

14. The fixing device according to claim 8, comprising
a buffer portion disposed between the cylindrical lens and the first fixing portion, and wherein the first fixing portion is interposed between the buffer portion and the second fixing portion.

15. The fixing device according to claim 14, wherein
the buffer portion serves as a spacer between the cylindrical lens and the first fixing portion.

16. The fixing device according to claim 8, wherein the first fixing portion has an inner surface and an outer surface and wherein the second fixing portion has an inner surface and an outer surface, and wherein the inner surface of the second fixing portion radially surrounds and faces toward the outer surface of the first fixing portion.

* * * * *